US008589032B2

(12) United States Patent
Witte

(10) Patent No.: US 8,589,032 B2
(45) Date of Patent: Nov. 19, 2013

(54) SECURITY SYSTEM

(75) Inventor: Martin Witte, Ahaus (DE)

(73) Assignee: Huf Hulsbeck & Furst GmbH & Co. (DE)

( * ) Notice: Subject to any disclaimer, the term of this patent is extended or adjusted under 35 U.S.C. 154(b) by 343 days.

(21) Appl. No.: 13/002,469

(22) PCT Filed: Jul. 2, 2009

(86) PCT No.: PCT/EP2009/058350
§ 371 (c)(1),
(2), (4) Date: Feb. 17, 2011

(87) PCT Pub. No.: WO2010/000815

PCT Pub. Date: Jan. 7, 2010

(65) Prior Publication Data

US 2011/0160966 A1 Jun. 30, 2011

(30) Foreign Application Priority Data

Jul. 3, 2008 (DE) ......................... 10 2008 031 216
Jan. 20, 2009 (DE) ......................... 10 2009 005 525

(51) Int. Cl.
*B60R 22/00* (2006.01)

(52) U.S. Cl.
USPC .................................. 701/45; 70/264; 70/280

(58) Field of Classification Search
USPC ................ 701/45, 110; 180/179; 70/264, 280
See application file for complete search history.

(56) References Cited

U.S. PATENT DOCUMENTS

| | | | | |
|---|---|---|---|---|
| 7,105,943 | B2 * | 9/2006 | Willats et al. | 307/10.1 |
| 2006/0006672 | A1 | 1/2006 | Fujihara et al. | |
| 2009/0017781 | A1 * | 1/2009 | Fujii | 455/127.1 |

FOREIGN PATENT DOCUMENTS

| | | |
|---|---|---|
| DE | 592591 | 6/1934 |
| DE | 10 2005 014 581 | 9/2006 |
| DE | 10200501458 | 9/2006 |
| DE | 102005014581 | 9/2006 |
| DE | 60213945 | 3/2007 |
| DE | 60220227 | 2/2008 |
| DE | 102007047205 | 4/2009 |
| DE | 102007055115 | 5/2009 |
| EP | 1296009 | 3/2003 |
| EP | 1512814 | 3/2005 |
| GB | 2400404 | 10/2004 |
| GB | 2406608 | 4/2005 |
| JP | 04055579 | 2/1992 |

OTHER PUBLICATIONS

International Search Report; PCT/EP2009/058350; Dec. 4, 2009.

* cited by examiner

*Primary Examiner* — Thomas Black
*Assistant Examiner* — Luke Huynh
(74) *Attorney, Agent, or Firm* — Cantor Colburn LLP

(57) ABSTRACT

A security system having an inner door handle of a door for a vehicle. The door is brought into a locked and unlocked state with a locking system. The security system includes an actuator triggering an actuation process for opening a lock of the locking system when activated, and an identification element detecting an approach around a zone of the actuator or a contact with the actuator when the identification has been positive. The locking system has an unblocked mode wherein the locking system is in the unlocked state and the actuator is effectively connected to the lock. A control unit is in data communication with the locking system and identification element. The control unit puts the locking system in the unblocked mode once the identification has been positive and the vehicle outputs an unblocking signal such that the actuation process is triggered by activating the actuator.

18 Claims, 6 Drawing Sheets

SECURITY SYSTEM

TECHNICAL FIELD

The invention concerns a security system with an inner door handle of a door of a vehicle. The invention also concerns a method for operation of a security system with an inner door handle of a vehicle door.

BACKGROUND

A method and device to avoid collision on opening of a vehicle door is shown in DE 10 2005 014 581 A1. The objective of the device is to prevent an approaching obstacle from coming into contact with the vehicle door. To achieve this, the device proposes a proximity sensor, which detects approach of a hand to the inner door handle of the vehicle. Monitoring of a vehicle environment for approaching obstacles is triggered on this account. In the event that an obstacle is found, the device issues a warning signal for an occupant of the vehicle, so that he refrains from opening the vehicle door. A drawback here has been that, despite acoustic or optical warning, the door can be opened. The described device therefore does not prevent the occurrence of undesired accidents.

BRIEF SUMMARY

The task of the present invention is to devise a security system with an inner door handle of a vehicle door, which overcomes the aforementioned drawbacks, especially permits simple and safe opening of a door.

The invention concerns a security system with an inner door handle of a vehicle door, in which the door can be brought by a locking system into a locked state and an unlocked state with an actuator that triggers, on activation, an actuation process to open a lock of a locking system with an identification element, which detects, on positive identification, approach around an area of the actuator or touching of the actuator, a release mode for the locking system is provided, in which the locking system is in an unlocked state, the actuator being effectively connected to the lock, wherein a control unit is in data communication with the locking system and the identification element, in which case the control unit only brings the locking system into the release mode after positive identification and with a release signal on the vehicle side, so that the actuation process can be triggered by activation of the actuator.

The core of the security system according to the invention comprises the fact that activation of the actuator does not automatically lead to opening of the lock of the locking system. Instead, the locking system must be in a release mode for this purpose. In order to reach the release mode, two prerequisites must be met. In the first place, the identification element must detect penetration into an area of the actuator. This penetration can be triggered, for example, by a hand of a vehicle occupant, who would like to operate the actuator. During movement toward the actuator, the hand of the vehicle occupant passes through the area around and/or at the actuator. This penetration is detected by the identification element as positive identification and optionally leads to generation of the corresponding signal. The second prerequisite is that a release signal is present. The release signal can be dependent on a number of conditions, which are explained further below. For example, it can be required that the release signal requires falling short of a predefined maximum speed. If the release signal on the vehicle side and penetration into the area around the actuator are detected in parallel, the locking system changes into the release mode. It is now possible for the vehicle occupant to open the lock by operating the actuator, in order to be able to open the door of the vehicle. If the release signal on the vehicle side is not present, the lock cannot be opened, despite approach to the actuator. Consequently opening of the door is not possible.

The second variant of the main claim according to the invention permits the identification element to also detect touching of the actuator, in order to trigger positive identification. In the context of the invention, the term touching of the actuator means haptic contact with the actuator. Consequently, this term includes touching, swiping over and/or enclosing the actuator. The term touching should also describe a movement of the actuator. Touching of the actuator therefore also includes pivoting, pulling out or pushing in the actuator.

It is possible for the control unit to receive the release signal on the vehicle side from a vehicle management system. The control unit can also optionally be part of the vehicle management system. The control unit is the part of the security system that receives the release signal on the vehicle side, in order to transfer the locking system into the release mode in combination with positive identification. The advantage of the described arrangement of the control unit comprises the fact that this information can be obtained from existing systems. Easy integration of the security system according to the invention in existing vehicles is thus possible. Any system integrated in the vehicle, and via which individual devices and/or elements of the vehicle communicate with each other and/or are managed centrally, is then referred to as vehicle management system. As an alternative, it is possible that the control unit generates the release signal on the vehicle side after receipt of at least one item of vehicle information. For this purpose, the control unit is provided with vehicle information that is essential for functioning of the security system. The control unit generates the release signal on the vehicle side from this vehicle information. According to the invention, the vehicle information can include at least one of the following items of information: a vehicle speed of the vehicle or a setting of a child safety. For example, it can be required that the release signal on the vehicle side is only generated, if the vehicle speed of the vehicle is below a predefined maximum speed. If the identification element detects approach of an object into the area of the actuator, the control unit is informed of the actual vehicle speed. This can be triggered by a corresponding query of the control unit. The control unit then compares the actual vehicle speed of the vehicle with the predefined maximum speed. If the vehicle speed of the vehicle falls below the maximum speed, the control unit generates the release signal on the vehicle side. The advantage of this variant is that the vehicle information present in the vehicle management system concerning the vehicle speed of the vehicle can be easily fed to the security system according to the invention. Simple integration of the security system in existing vehicles is therefore possible.

An advantageous variant of the security system according to the invention is characterized by the fact that the identification element has at least a first sensor, in order to monitor the area by means of electromagnetic waves. The task of the identification element is to record penetration into an area at and/or around the actuator. In order for this to occur, it has proven advantageous, if the identification element has the first sensor. It should use electromagnetic waves to monitor the area. Depending on the configuration of the first sensor, the electromagnetic waves can have different wavelengths. It is essential that touching of the first sensor is not required, in order to detect approach. Instead, a disturbance of the electromagnetic waves is sufficient to allow the first sensor and/or identification element to positively identify approach. This type of identification element has the advantage that approach to and/or around the area of the actuator is identified early, so that a sufficient time interval is available for the control unit to receive the release signal on the vehicle side and/or to generate and/or query it. In an advantageous variant, the first sensor identifies not only penetration into the area of the actuator, but also a movement direction of penetration. The first sensor can therefore determine whether a hand of a vehicle occupant is passed by the actuator or moved toward it. The identification element can detect not only a positive identification of an approach around the area of the actuator, but can also trigger additional useful signals. For example, the passing of a hand by the actuator induces that a light in the vehicle is activated. This embodiment has the advantage that a number of functions can be triggered on the inner door handle, especially the identification element.

If the area around the actuator is monitored by electromagnetic waves, it has proven advantageous to influence the alignment and/or size of the monitored area by deliberate shielding. The electromagnetic waves that are used for monitoring can be influenced in their propagation by deliberate shielding. Shielding, like soft iron, binds the flux of electromagnetic waves and thus ensures limitation and possibly a change in field strength distribution. By appropriate arrangement of shields within the inner door handle, it is possible to ensure that positive identification is only triggered, when a user intervenes in the inner door handle. By influencing the electromagnetic field, it can be ensured that passing a human hand along the inner door handle is not detected as positive identification. Instead, influencing the alignment of the electromagnetic field means that a deliberate, willful approach to the inner door handle is required, in order to trigger positive identification.

An advantageous embodiment is characterized by the fact that the identification element has at least one touch sensor, in order to detect touching of the actuator. It is proposed according to the invention that positive identification, in combination with a release signal on the vehicle side, brings the control unit of the locking system into the release mode. In order to detect touching of the actuator, the touch sensor, on the one hand, can be designed so that it is sufficient to briefly touch the actuator with the hand. Accordingly, the touch sensor can be a strain gauge, which can also measure very small forces, so that vigorous touching of the actuator is not required. As an alternative, the touch sensor can also be a motion sensor or acceleration sensor, which records not only touching, but also movement of the actuator. Consequently, positive identification is triggered by movement of the actuator. The user would consequently grasp the actuator and transfer it from a null position to a pivoted out position. Since just a very small pivoting of the actuator can be sufficient to be recognized by the mentioned touch sensors, positive identification would be triggered that way. In combination with the release signal on the vehicle side, the control unit would then be in a position to bring the locking system into the release mode. Communication of the control unit with the other components of the security system according to the invention could then be rapid enough that a user would find no difference in operation of actuators known to him.

Another advantageous variant is characterized by the fact that the identification element has at least a second sensor, in order to record activation of the actuator. Activation and/or operation of the actuator serves to trigger the actuation process for opening the lock of the locking system. Depending on the configuration of the inner door handle and/or the locking system, this activation can be both mechanical and electronic. In the context of mechanical activation, the lock is mechanically pivoted by activation of the actuator. As an alternative or in addition, the second sensor can serve to permit activation of the actuator. Thus, touching of the second sensor of the identification element can be viewed as activation of the actuator. This activation of the actuator is recognized as activation of the locking system and triggers the actuation process. The second sensor then sends an electrical signal, which is received by the locking system and entails opening of the lock.

The first and/or second sensor advantageously has at least one of the following measurement elements: a capacitive element, an inductive element, a piezo element or a strain gauge element. Capacitive and inductive elements permit monitoring of an area at and/or around the actuator. No touching of the inner double handle is required to trigger a signal. Consequently, use of these two elements is especially worthwhile for the first sensor of the identification element. A piezo element and a strain gauge element convert touching to an electrical voltage or electrical signal and are therefore preferably used for the second sensor of the identification element.

In order to detect clear recording of approach to and/or around an area of the actuator, it has proven advantageous, if the identification element is arranged in and/or on at least one of the following elements: the actuator, a support element of the inner door handle or a handle shell of the inner door handle. Depending on the configuration of the identification element and the type of activation process, the different mentioned locations are each advantageous for positive identification. It is also advantageous, if the actuator has an activation position and a null position, in which the activation position can be reached by actuation and/or activation, especially pulling out or pivoting out of the actuator from the handle shell, and the actuator is unactivated in the null position. In order to achieve pivoting back of the actuator from the activation position to the null position, it has proven advantageous, if the inner door handle has a force accumulator, especially a spring. The force accumulator then serves for reversible transfer of the actuator from the activation position to the null position.

It has also proven advantageous, if the security system has an interface. This interface is arranged especially on the control unit and serves for bidirectional communication with the vehicle management system. Vehicle information to trigger the release signal on the vehicle side can be transmitted via the interface. It has then proven advantageous, if the interface has at least one of the following technologies: wireless LAN (IEEE 802.11), FireWire (IEEE 1394), USB (universal serial bus), HDMI (high definition multimedia interface), IrDA (Infrared Data Association), Bluetooth, Unilink, ATA/ATAPI (advanced technology attachment with packet interface), IEEE 488 or IEEE 1284. The security system can also have a detection circuit and/or an illumination element. The detection circuit is especially an integrated circuit that serves to process information from the identification element and/or the release signals on the vehicle side and evaluate them. The illumination element can be activated according to a release signal on the vehicle side or positive identification, in order to illuminate the actuator.

The aforementioned task is solved, in particular, by a security system with an inner door handle of a vehicle door, in which the door can be brought into a locked state and an unlocked state with an actuator, which, on activation, triggers an actuation process to open a lock of the locking system, with an identification element, which, on positive identification, detects approach around an area of the actuator, a release mode is provide for the locking system, in which the locking system is situated in the unlocked state, in which the actuator is effectively connected to the lock, in which a control unit is in data communication with the locking system and the identification element, in which case only after positive identification and only with a release signal on the vehicle side does the control unit bring the locking system into the release mode, so that the actuation process can be triggered via activation of the actuator.

The aforementioned task is also solved by a method for operation of a security system with an inner door handle for a vehicle, during which the door is reversibly brought into a locked state or unlocked state via a locking system, during activation of the actuator an actuation process to open an lock of the locking system is triggered, on positive identification, approach around an area of the actuator or touching of the actuator is detected by means of an identification element, a release mode for the locking system is provided, in which the locking system is in the unlocked state, in which the actuator is effectively connected to the lock, in which case a control unit is in data communication with the locking system and the identification element, in which only after positive identification and only with a release signal on the vehicle side does the control unit bring the locking system into the release mode, so that the actuation process is triggered by activation of the actuator. Features and details that were described in conjunction with the security system according to the invention then also apply for the method according to the invention and vice versa.

Another method step according to the invention proposes that the release signal on the vehicle side is generated after the vehicle falls below a maximum speed. The security system can therefore only generate the release mode for the locking system, when the vehicle is moving with a vehicle speed that is less than the maximum speed. Only at this point is the release signal on the vehicle side generated and transmitted to the control unit or generated by it. The maximum speed on the vehicle side can be set up, so that opening of a vehicle door is not considered hazardous at this vehicle speed. The maximum speed can thus be 10 km/h, especially 5 km/h. At these vehicle speeds, opening of the door of the vehicle has an acceptable risk. Consequently, the release signal on the vehicle side is transmitted to the control unit. If the actuator is activated, the actuation process for opening of the lock can be triggered. It is also possible that the release signal on the vehicle side is generated and/or transmitted by means of a mobile identification transmitter. The mobile identification transmitter serves for keyless activation of the locking process of the vehicle. For this purpose, an electronic unit with at least one transmitter and receiver unit is incorporated in the mobile identification transmitter. The transmitter and receiver unit can then be connected to a communication unit on the vehicle side, by means of which an identification check to establish user authorization can be performed. In the context of this communication, additional control commands can also be sent to the vehicle. These control commands can be part of the release signal on the vehicle side and/or part of the requirements for generation of the release signal on the vehicle side. For example, a signal that activates a child safety can be transmitted to the vehicle with the mobile identification transmitter. On this account, it is ruled out that a release signal on the vehicle side is transmitted to the control unit. Only when the child safety is deactivated again can the release signal on the vehicle side be transmitted to the control unit. This ensures that children, who are in the vehicle, cannot trigger an actuation process to open the lock of a locking system by activation of the actuator. Thus, it is not possible for them to open the door of the vehicle from the inside.

Another variant of the method according to the invention proposes that during positive identification, the release signal on the vehicle side is queried. In this case, positive identification of approach to and/or around an area of the actuator triggers a query of the release signal on the vehicle side by the control unit. The control unit consequently does not wait for transmittal of the release signal on the vehicle side, but makes an effort to obtain it. In this case, it has proven advantageous, if, during positive identification, a vehicle speed and/or setting of a child safety is queried. These two items of vehicle information can be processed in the control unit, in order to generate the corresponding release signal on the vehicle side. Thus, on positive identification, a comparison of the vehicle speed with a predefined maximum speed can be made.

Another embodiment of the method according to the invention proposes that during penetration into the area around and/or at the actuator, the inner door handle and/or parts of the inner door handle are illuminated. Illumination of the inner door handle has the advantage that a better view is offered to an occupant of the vehicle. LEDs and/or OLEDs work, in particular, as illumination element, since these are particularly current-sparing and efficient. The illumination elements can then be arranged in the inner door handle, in the handle shell of the inner door handle or the support of the inner door handle. It has also proven advantageous, if the identification element is arranged in and/or on the illumination element. Since the region of the inner door handle illuminated by the illumination element often coincides with the area around the actuator, the probability of incorrect operation is reduced by the embodiment according to the invention.

The illumination element can have especially electronic and/or electrical devices, like resistors, capacitors, integrated circuits, in order to control the light sources. Those electrical and/or electronic devices can be used at least partially by the identification element. A power supply of the illumination element, for example, can also supply the identification element with electrical current and/or voltage. In a particularly advantageous embodiment, the light source of the illumination element can be an OLED. In this case, at least one electrode of the OLED could also be used as the electrode of the identification element. A reduction in the employed components would be obtained on this account, since the electrodes of the OLED are used both for light generation and generation of a field, which can detect approach into the area of the actuator.

Another advantageous method step of the method according to the invention proposes that effective connection of the actuator is configured ineffective at a vehicle speed greater than the maximum speed. The term switching ineffective in the context of the invention then means that activation of the actuator does not lead to an actuation process and therefore to opening of the lock of the locking system. This effective connection is advantageously mechanically switched ineffective. For example, a transmission linkage can be released from its mechanical engagement with the actuator. Pivoting of the actuator therefore does not lead to mechanical opening of the lock of the locking system. However, it is also conceivable that effective connection can be made ineffective electrically and/or electronically. The locking system can therefore have an electrically controlled lock. Consequently, only an electrical pulse is transmitted to the locking system in the context of the actuation process by the actuator and/or security system. In order to make the effective connection ineffective, electrical and/or electronic transmission of the signal is prohibited. In both described cases, activation of the actuator does not lead to an actuation process and therefore does not lead to opening of the lock of the locking system. In addition, the actuator can be mechanically and/or electrically and/or electronically separated from the locking system at a vehicle speed greater than the maximum speed.

Another advantageous embodiment of the method according to the invention is characterized by the fact that, during touching of the actuator, the inner door handle and/or parts of the inner door handle are illuminated. During touching of the actuator in this embodiment, not only is positive identification triggered, but illumination is also activated. The illumination element, which was activated by touching, then illuminates the inner door handle or parts of it. In particular, visible feedback for a user can be provided, who now knows that positive identification was triggered.

Additional expedients and advantages of the invention are apparent from the claims, the following description and the drawings. The invention is shown in several practical examples of the drawings. All features and/or advantages following from the claims, description or drawing, including design details, spatial arrangements and method steps, can be essential to the invention in themselves and in a variety of combinations. In the drawings:

DETAILED DESCRIPTION

Figure 1:
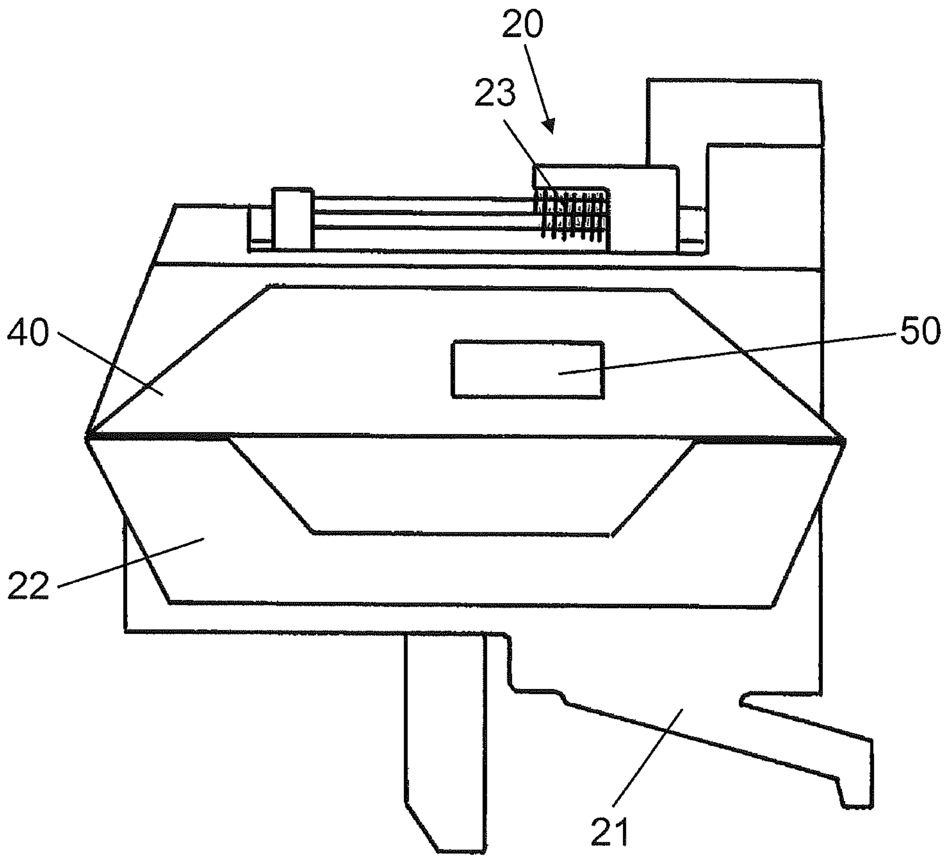
FIG. 1 shows a schematic drawing of an inner door handle.

An inner door handle 20 of the security system 10 according to the invention is shown in FIG. 1. The inner door handle 20 is prescribed to be integrated in the inside of a door of a vehicle. An occupant of the vehicle can bring a locking system of the vehicle door into an unlocked state by means of inner door handle 20, so that the door can be opened. The inner door handle 20 has a support element 21 as a base. A handle shell 22 is arranged on the support element 21. In the depicted practical example, the handle shell 22 is covered in areas by an actuator 40. The occupant of the vehicle can grasp in the handle shell 22 and then grasp beneath the actuator 40. By activation of actuator 40, an actuation process can be triggered. In the context of the actuation process, opening of the lock of the locking system then occurs.

In the depicted practical example, activation of the actuator occurs by pivoting out the actuator from handle shell 22. The actuator 40 is shown in a null position in FIG. 1. The actuator 40 is unactivated in this null position. If the vehicle occupant would like to open the lock of the locking system, activation of the actuator 40 is required for this purpose. To do this the vehicle occupant engages behind the actuator 40 and transfers it by a pivoting movement into an activation position. In the context of the activation position, the actuator then acts on the lock of the locking connection. In order to ensure reversible return of the actuator 40 from the actuating position to the null position, the inner door handle 20 has a force accumulator 23. In the depicted practical example the force accumulator 23 is a spring.

Figure 2:
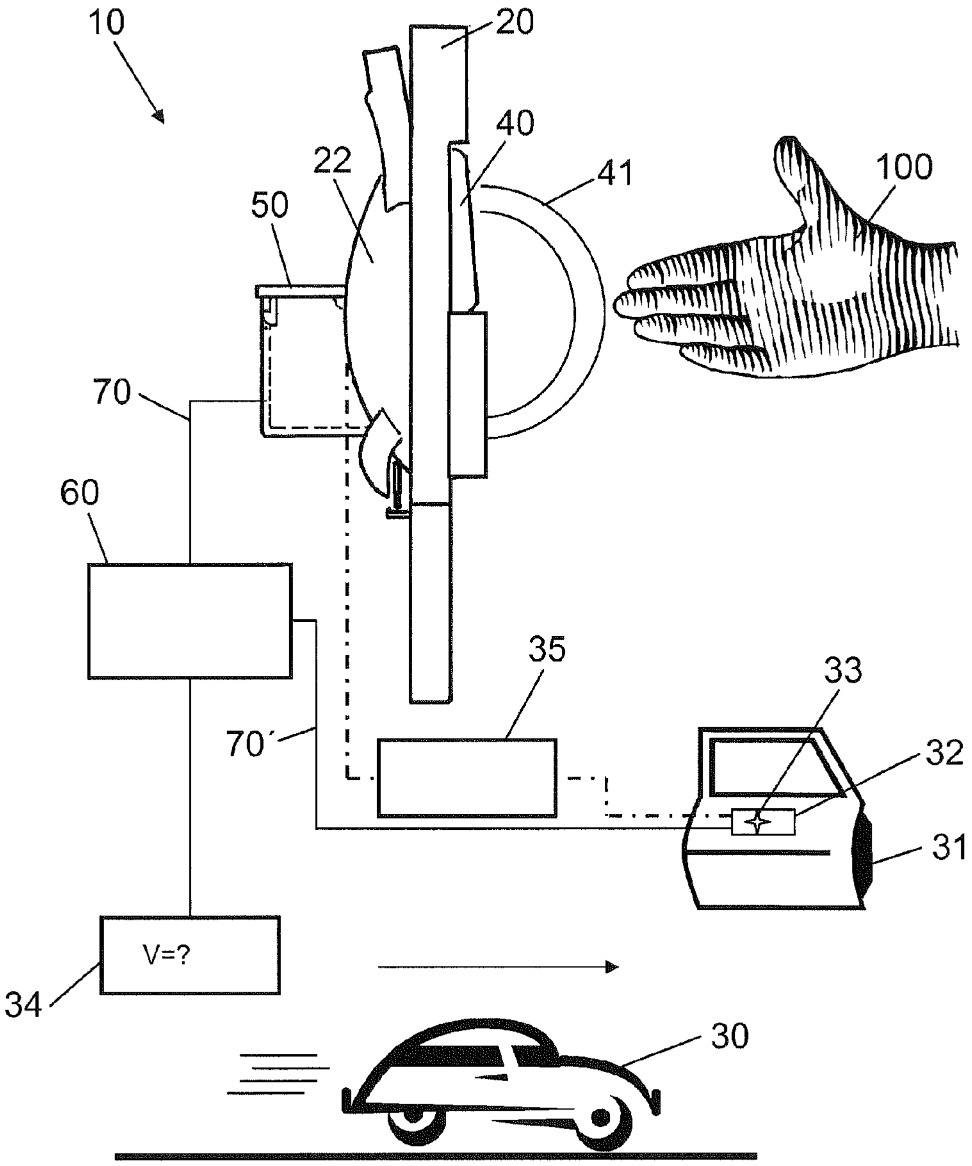
FIG. 2 shows a security system according to the invention.
Figure 3:
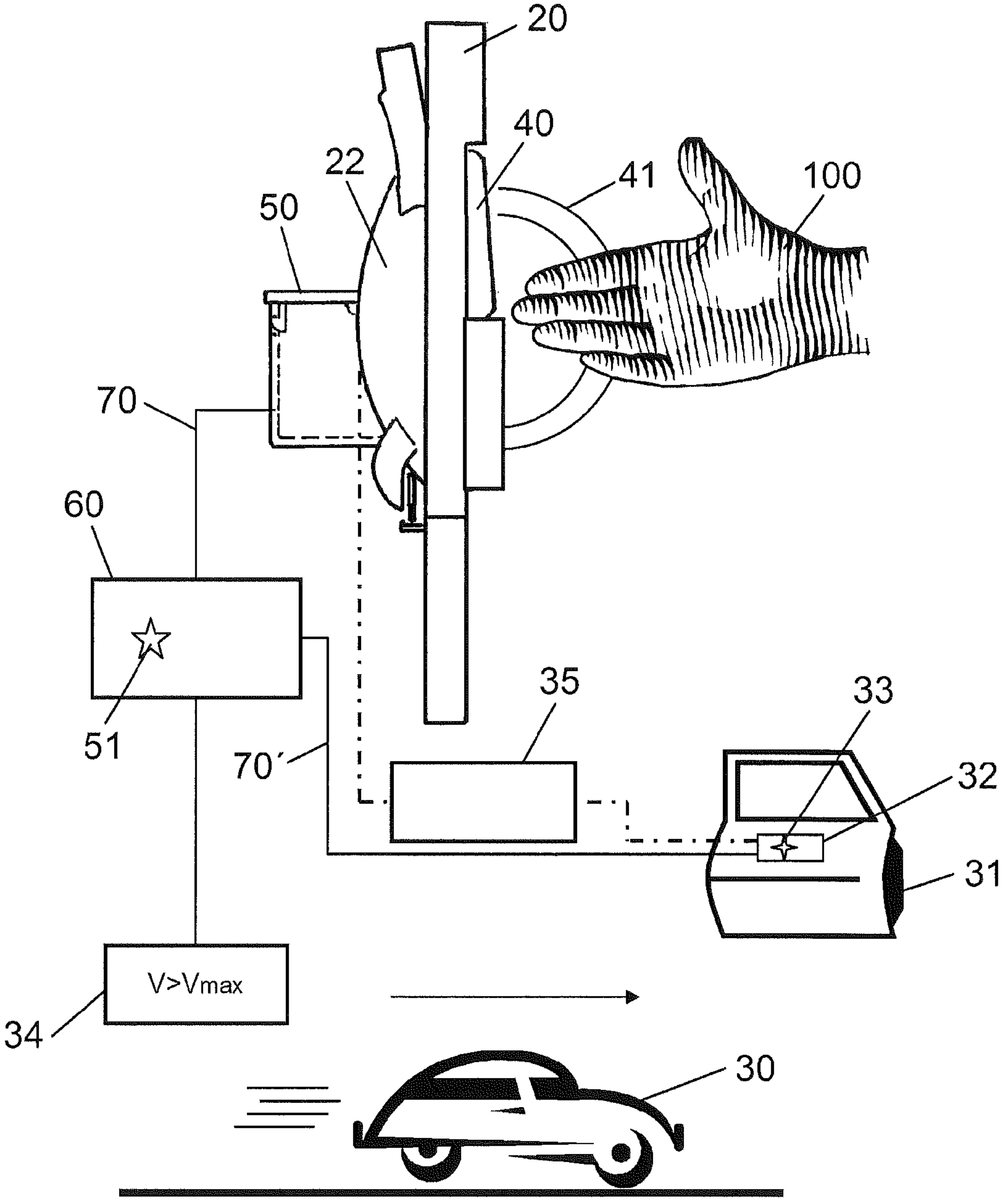
FIG. 3 shows a security system according to the invention during positive recognition of approach.

The aforementioned task is solved by the security system according to the invention in that opening of the lock of the locking system is only possible when the locking system is situated in a release mode. FIGS. 2 to 5 show how the security system 10 enters the release mode. The security system 10 in FIG. 2 is shown with its components. A central component is the inner door handle 20, which is schematically shown in a side view. The inner door handle 20 has the actuator 40, which, on activation, can trigger an actuation process for opening of the lock 33 of the locking system 32. The inner door handle 20 according to the invention is integrated in a door 31 of a vehicle 30 and connected to a locking system 32 via an effective connection 35. Activation of the actuator 40 can open the lock 33 of the locking system 32. Pivoting out of the door 31 is then possible, so that an occupant can leave the vehicle 30.

The inner door handle 20 also has an identification element 50, which records approach into and/or near and/or around an area 41 around and/or at the actuator 40. It is then proposed according to the invention that the identification element 50 records when an object 100, like a hand, approaches the actuator 40. If the identification element 50 recognizes this approach, a positive identification 51 is triggered. Approach of the object 100 has still not occurred in FIG. 2, so that the positive identification 51 need not be triggered. However, this is the case in FIG. 3. As is apparent, the object 100 has approached the actuator 40, so that it has penetrated into the area 41 around the actuator 40. It should then be kept in mind that the object 100 still does not touch the inner door handle 20. Instead, early identification is involved, if the object 100 has penetrated into the area 41 of the actuator 40. Consequently, at this point activation of the actuator 40 has still not been performed. Individual electronic components of the identification element 50 can be arranged on the back of handle shell 22 of inner door handle 20. The identification element 50 is in data communication 70 with a control unit 60 and in data communication 70' with the locking system 32. Through approach of object 100 into the area 41, a positive identification 51 is triggered in control unit 60. Positive identification 51 alone, however, is not sufficient to transfer the locking system 32 into the release mode. Instead, a release signal on the vehicle side is still required. This release signal on the vehicle side can be dependent on a state of the vehicle 30. In the depicted practical example, the release signal on the vehicle side is dependent a vehicle speed (marked "V" in the drawings), with which the vehicle 30 is moving forward. The starting point of this consideration is that it is not supposed to be possible for an occupant of the vehicle 30 to open a door 31, if the vehicle is moving at a vehicle speed greater than a stipulated maximum speed (marked "Vmax" in the drawings). In the depicted practical example, it is to be assumed that the vehicle 30 is moving with a vehicle speed 34 that is greater than the stipulated maximum speed. This stipulated maximum speed can be between 5 km/h and 10 km/h and depends on the configuration of door 31 and/or vehicle 30.

Deviating from the depicted practical example, the identification element 50 can also trigger a positive identification, when touching of the actuator 40 is detected. In this variant, it is proposed according to the invention that the identification element 50 records when an object 100, for example, a hand, touches the actuator 40. Touching can also be mechanical activation of the actuator, i.e., pivoting and/or axial displacement of the actuator. If the identification element 50 recognizes this touching, a positive identification 51 is triggered. This touching is shown, for example, in FIG. 4. By touching of the actuator 40, positive identification 51 is triggered, which, in combination with the release signal 80 on the vehicle side, causes the control unit 60 to transfer the locking system into the release mode. The variant of the security system 10 according to the invention depicted in the figures is primarily concerned with the fact that approach around the area 41 of actuator 40 is detected. However, this should not be understood as a restriction. The identification element 50 can also be a system that detects touching of the actuator 40. Comments made in describing the figures, with reference to the security system, to the effect that approach around the area 41 of the actuator 40 is detected, likewise apply for the security system 10, which detects touching of the actuator. All advantages, variants and elements are then used for both variants of the security system 10 according to the invention.

Figure 4:
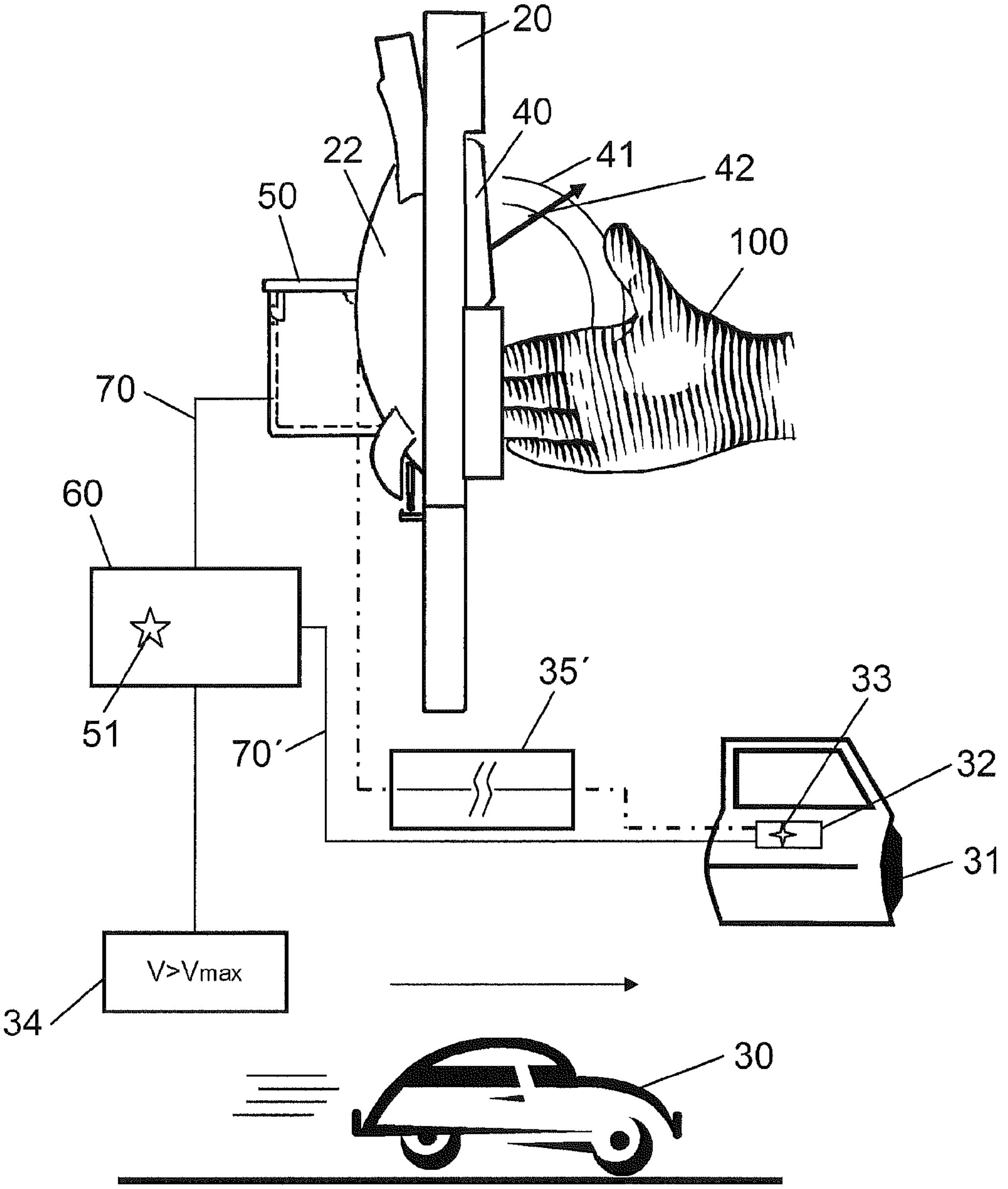
FIG. 4 shows the security system during activation of an actuator.

Since the vehicle 30 is moving with a vehicle speed 34 that is greater than the predefined maximum speed, the control unit 60 receives and/or generates no release signal on the vehicle side. Consequently, the locking system 32 cannot be transferred to the release mode. Activation 42 of the actuator 40 therefore does not result in opening of lock 33 of the locking system 32, as shown in FIG. 4. Instead, effective connection 35' between the actuator 40 and the locking system 32 is switched ineffective. Activation 42 therefore does not transfer the locking system 32 into the unlocked state.

Figure 5:
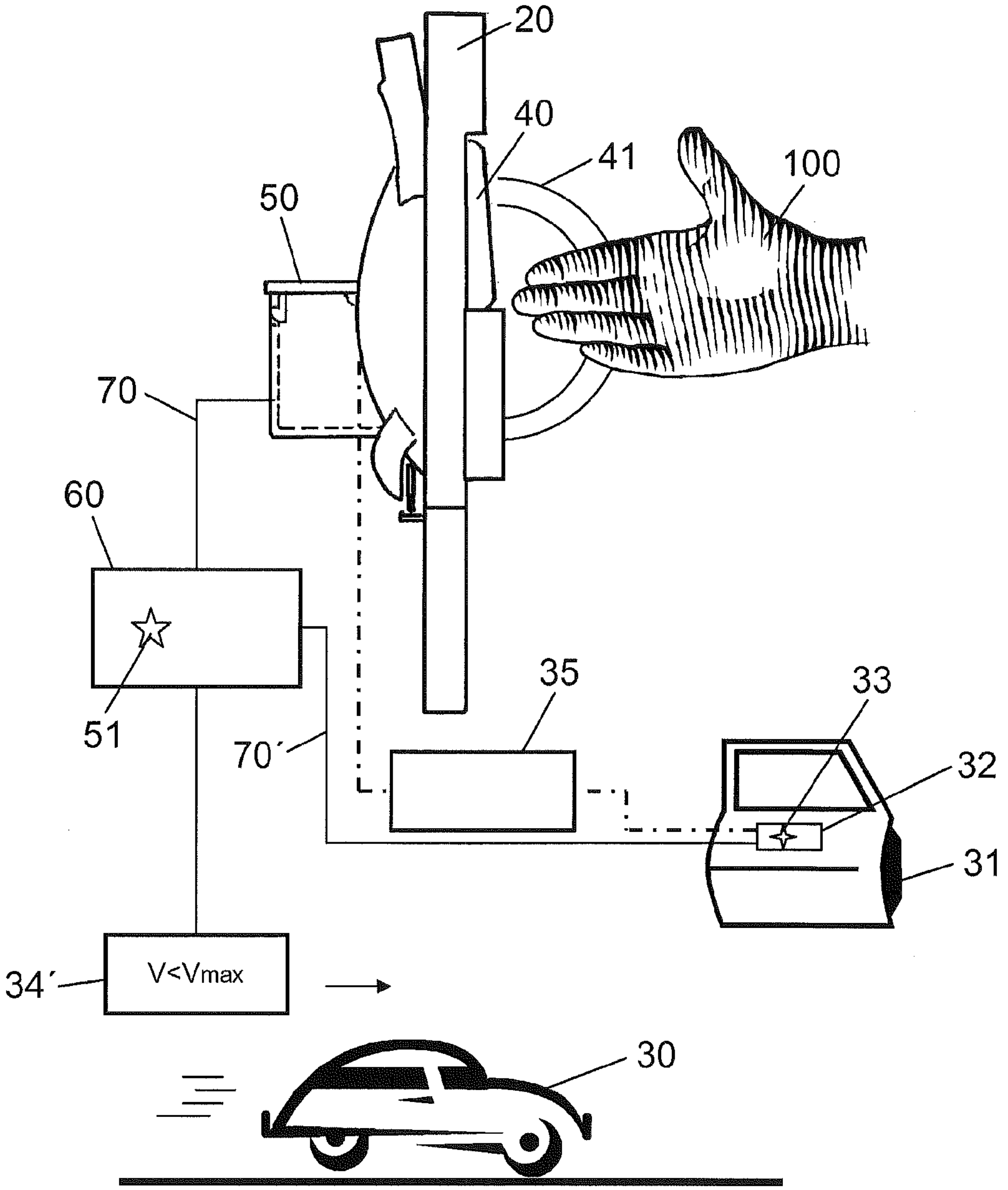
FIG. 5 shows the security system during positive identification and reduced vehicle speed of the vehicle and FIG. 6 shows the security system according to the invention in a release mode.

The security system 10 according to the invention is shown again in FIG. 5. However, it is assumed here that the vehicle speed 34' is less than a predefined maximum speed of vehicle 30. The object 100 approaches the area 41 of actuator 40. The identification element 50 detects this approach and generates a positive identification 51 in control unit 60. As already explained in FIG. 3, no touching of the actuator 40 by object 100 is required at this point.

Figure 6:
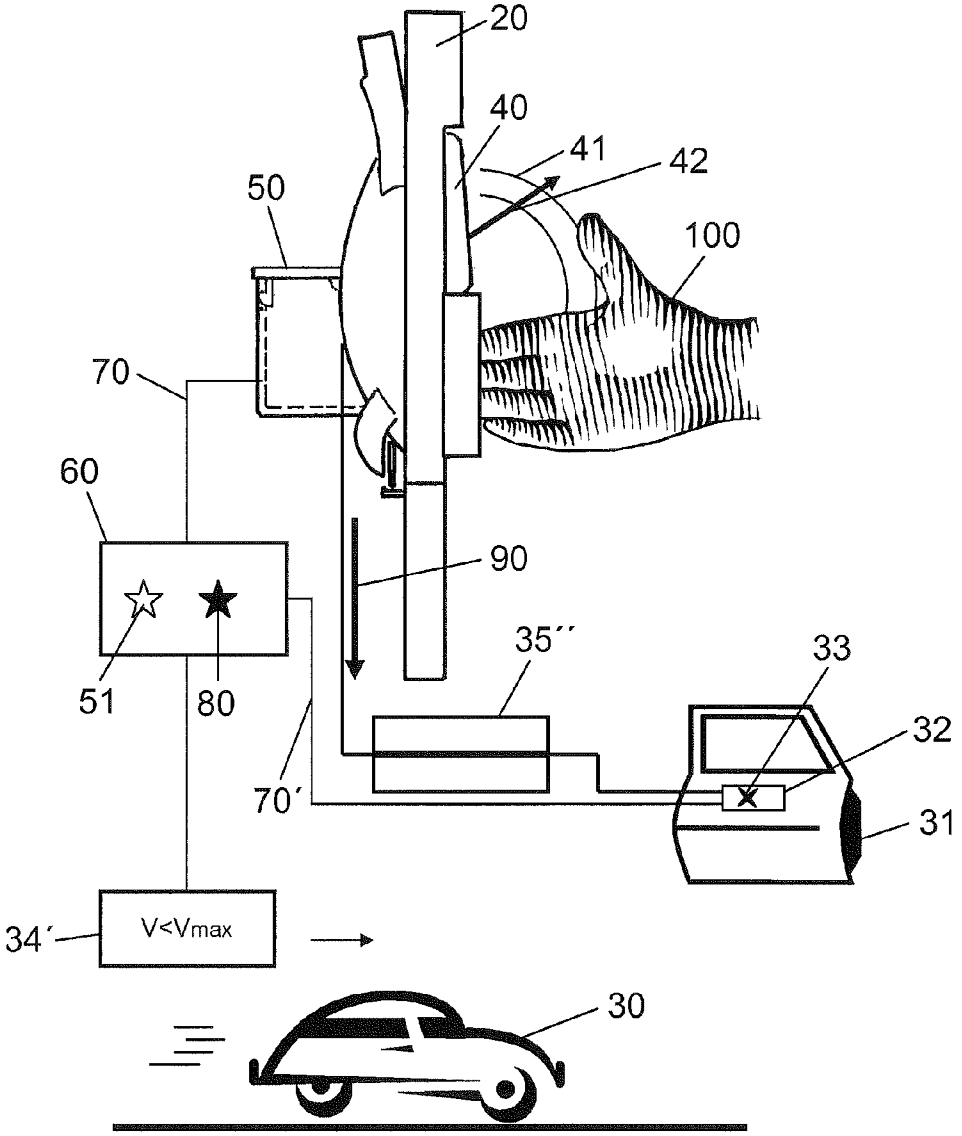

As shown in FIG. 6, the control unit 60 receives a release signal 80 on the vehicle side. This release signal 80 on the vehicle side can come, for example, from a speed monitoring unit, which determined that the vehicle speed 34' is less than the stipulated maximum speed. The combination of positive identification of positive identification 51 and the release signal 80 on the vehicle side permits the control unit 60 to check [sic: transfer] the locking system 32 into the release mode. Activation 42 of the actuator 40 can now trigger actuation process 90. In the context of actuation process 90, the actuator 40 is in effective connection 35" with the lock 33 of the locking system 32. Consequently, by activation 42 of actuator 40, the lock 33 of the locking system 32 is opened. It is possible for a vehicle occupant to pivot out the door and leave the vehicle.

Owing to the fact that the release mode has two prerequisites—positive identification 51 and release signal 80 on the vehicle side—undesired opening of door 31 of vehicle 30 can be prevented. It is ensured by the predefined release signal 80 on the vehicle side that the vehicle 30 is in a state, in which opening of the door 31 is also desired. If the vehicle 30 is not in this state, activation 42 of actuator 40 does not lead to opening of lock 33, so that the door 31 cannot be swung out. Consequently, increased safety is achieved by the security system 10 according to the invention.

The invention claimed is:

1. Security system with an inner door handle of a door of a vehicle, in which the door can be brought by a locking system into a locked state and into an unlocked state, with an actuator, which, on activation, triggers an actuation process for opening of a lock of locking system, with an identification element, which, on positive identification, detects an approach around an area of the actuator, a release mode is provided for the locking system, in which the locking system is situated in the unlocked state, during which the actuator can be brought into an effectively connection with the lock, in which a control unit is in data communication with the locking system and the identification element, in which the control unit only brings the locking system into the release mode after a positive identification and on a release signal on the vehicle side, so that the actuation process can be triggered by activation of the actuator.

2. Security system according to claim 1, wherein the control unit receives the release signal on the vehicle side from a vehicle management system, wherein the control unit is part of the vehicle management system.

3. Security system according to claim 1, wherein the control unit generates the release signal on the vehicle side after receiving at least one piece of vehicle information.

4. Security system according to claim 3, wherein the vehicle information has at least one of the following pieces of information: a vehicle speed of the vehicle or a setting of a child safety.

5. Security system according to claim 1, wherein the control unit generates the release signal on the vehicle side, after falling short of a maximum speed by the vehicle.

6. Security system according to claim 1, wherein the identification element has at least a first sensor, in order to monitor the area by electromagnetic waves.

7. Security system according to claim 1, wherein the identification element has at least a second sensor to record the activation of the actuator.

8. Security system according to claim 6, wherein the first or the second sensor has at least one of the following measurement elements: a capacitive element, an inductive element, a piezo element or a strain gauge element.

9. Security system according to claim 1, wherein the identification element is arranged in or on at least one of the following elements: the actuator, a support element of the inner door handle or a handle shell of the inner door handle.

10. Security system according to claim 1, wherein the actuator has an activation position and a null position, in which the activation position can be reached by activation or an act, comprising pulling out or pivoting out of the actuator from the handle shell, and the actuator is inactivated in the null position.

11. Security system according to claim 1, wherein the security system has a detection circuit and/or an illumination element.

12. Method for operation of a security system with an inner door handle of a door of a vehicle, in which the door is reversibly brought into a lock state or an unlock state by a locking system, during activation of the actuator, an actuation process for opening of a lock of the locking system is triggered, on positive identification, an approach around an area of the actuator detected by an identification element, a release mode for the locking system is provided, in which the locking system is in the unlocked state, in which the actuator can be brought into an effective connection with the lock, in which a control unit is in data communication with the locking system and the identification element, in which only after a positive identification and only on a release signal on the vehicle side does the control unit bring the locking system into the release mode, so that the actuation process is triggered via an activation of the actuator.

13. Method according to claim 12, wherein the release signal on the vehicle side is generated after the vehicle falls below a maximum speed, wherein the release signal on the vehicle side is generated by a mobile identification transmitter.

14. Method according to claim 12, wherein on positive identification, the release signal on the vehicle side is queried, on positive identification, a vehicle speed or a setting of a child safety is queried, wherein on positive identification, a comparison of the vehicle speed with a predefined maximum speed is carried out.

15. Method according to claim 12, wherein on penetration into the area around or at the actuator, the inner door handle or parts of the inner door handle are illuminated.

16. Method according to claim 12, wherein the effective connection of the actuator is switched ineffective mechanically, electrically or electronically.

17. Method according to claim 16, wherein the effective connection of the actuator at a vehicle speed (34, 34') greater than the maximum speed is switched ineffective, wherein at a vehicle speed (34, 34') greater than the maximum speed, the actuator is separated mechanically, electrically, or electronically from the locking system.

18. Security system according to claim 1, wherein the security system can be operated according to a method for operation of a security system with an inner door handle of a door of a vehicle, in which the door is reversibly brought into a lock state or an unlock state by a locking system, during activation of the actuator, an actuation process for opening of a lock of the locking system is triggered, on positive identification, an approach around an area of the actuator is detected by an identification element, a release mode for the locking system is provided, in which the locking system is in the unlocked state, in which the actuator can be brought into an effectively connection with the lock, in which a control unit is in data communication with the locking system and the identification element, in which only after a positive identification and only on a release signal on the vehicle side does the control unit bring the locking system into the release mode, so that the actuation process is triggered via an activation of the actuator.

* * * * *